United States Patent [19]
Knutsen et al.

[11] Patent Number: 5,746,314
[45] Date of Patent: May 5, 1998

[54] DISC CASE

[76] Inventors: Stian V. Knutsen, Veritasv. 2, N-1322 Hövik, Norway; Jan Fresvig, N-7520, Hegra, Norway

[21] Appl. No.: 700,385
[22] PCT Filed: Dec. 14, 1994
[86] PCT No.: PCT/NO94/00205
 § 371 Date: Dec. 30, 1996
 § 102(e) Date: Dec. 30, 1996
[87] PCT Pub. No.: WO95/17752
 PCT Pub. Date: Jun. 29, 1995

[30] Foreign Application Priority Data

Dec. 22, 1993 [NO] Norway ................................ 934783

[51] Int. Cl.$^6$ .................................................. B65D 85/57
[52] U.S. Cl. ...................... 206/308.1; 206/309; 206/310
[58] Field of Search ........................ 206/307, 308.1, 206/309, 310, 312, 755, 493

[56] References Cited

U.S. PATENT DOCUMENTS

| | | | |
|---|---|---|---|
| 4,635,792 | 1/1987 | Yamada et al. | 206/308.1 |
| 4,722,439 | 2/1988 | Grobecker et al. | 206/312 |
| 4,875,578 | 10/1989 | Nehl | 206/309 |
| 4,899,875 | 2/1990 | Herr et al. | 209/309.1 |
| 5,445,265 | 8/1995 | Herr et al. | 206/308.1 |
| 5,573,120 | 11/1996 | Kaufman et al. | 206/310 |

FOREIGN PATENT DOCUMENTS 62-31078  2/1987  Japan ................................ 206/308.1

*Primary Examiner*—David T. Fidel
*Attorney, Agent, or Firm*—Nawrocki, Rooney & Sivertson

[57] ABSTRACT

Container for compact discs and similar objects, with a pocket shaped disc cover (11) and a disc drawer (12) to be inserted in the disc cover with a disc. The disc drawer is provided with a circular recess (33) for the disc and a center member (23) to maintain the disc in position by engaging the center opening of the disc. The disc drawer is provided to be hinged along a hinge line (32) crossing the recess (22) in its front half, to bring an adjoining part (36) of the disc drawer (12) out of the disc plane. The disc drawer (12) is preferably provided with at least one slot (34, 35) along the hinge line (32), preferably one slot on each side of the center of the hinge line.

4 Claims, 2 Drawing Sheets

DISC CASE

FIELD OF THE INVENTION

The invention concerns a storage container for compact discs and similar data carriers.

BACKGROUND OF THE INVENTION

Containers for compact discs are known, which are constructed of two hinged shells and with an inner carrier rigidely connected to one of the shells. This design requires three different parts and an equal number of manufacturing tools. Further it inhibits the stacking of several containers in a column or in a rigid assembly side by side, because each container has to be removed from a storage site and be opened by opening the hinged parts. A further disadvantage of the known container, is the risk of damaging the hinge parts by frequent use or by several times of opening and closing.

SUMMARY OF THE INVENTION

The main object of the invention is to provide a container for compact discs and similar objects, allowing stacking and storage in an assembly side by side, without impairing the ease of gripping and inserting compact discs.

It is a further object to provide a container for compact discs, which can be manufactured with less parts and thus less or simpler manufacturing tools than prior art containers.

It is also an object to provide a container allowing easy removal of the compact discs or a similar object.

Finally it is an object to provide a container, which can easily be marked or be provided with a label showing the content both in a stack or in an assembly side by side.

The novel container can be prepared of two parts, i.e. the shell or discs sheath, which can be manufactured as two identical parts, and the core part or disc carrier. This enables the use of manufacturing tooling with lower costs, than with prior art container, the manufacturing being by extrusion of plastic material.

The most important advantage is however the function and the properties of use. Because several containers can be stacked with mating engagement or be mounted side by side in an assembly, it can be used more conveniently than prior art containers for storing several discs.

BRIEF DESCRIPTION OF THE DRAWINGS

The invention is described in more detail with reference to the drawings, in which FIG. 2 shows a lengthwise central section of the disc drawer, while

DETAILED DESCRIPTION OF THE INVENTION

Figure 1:
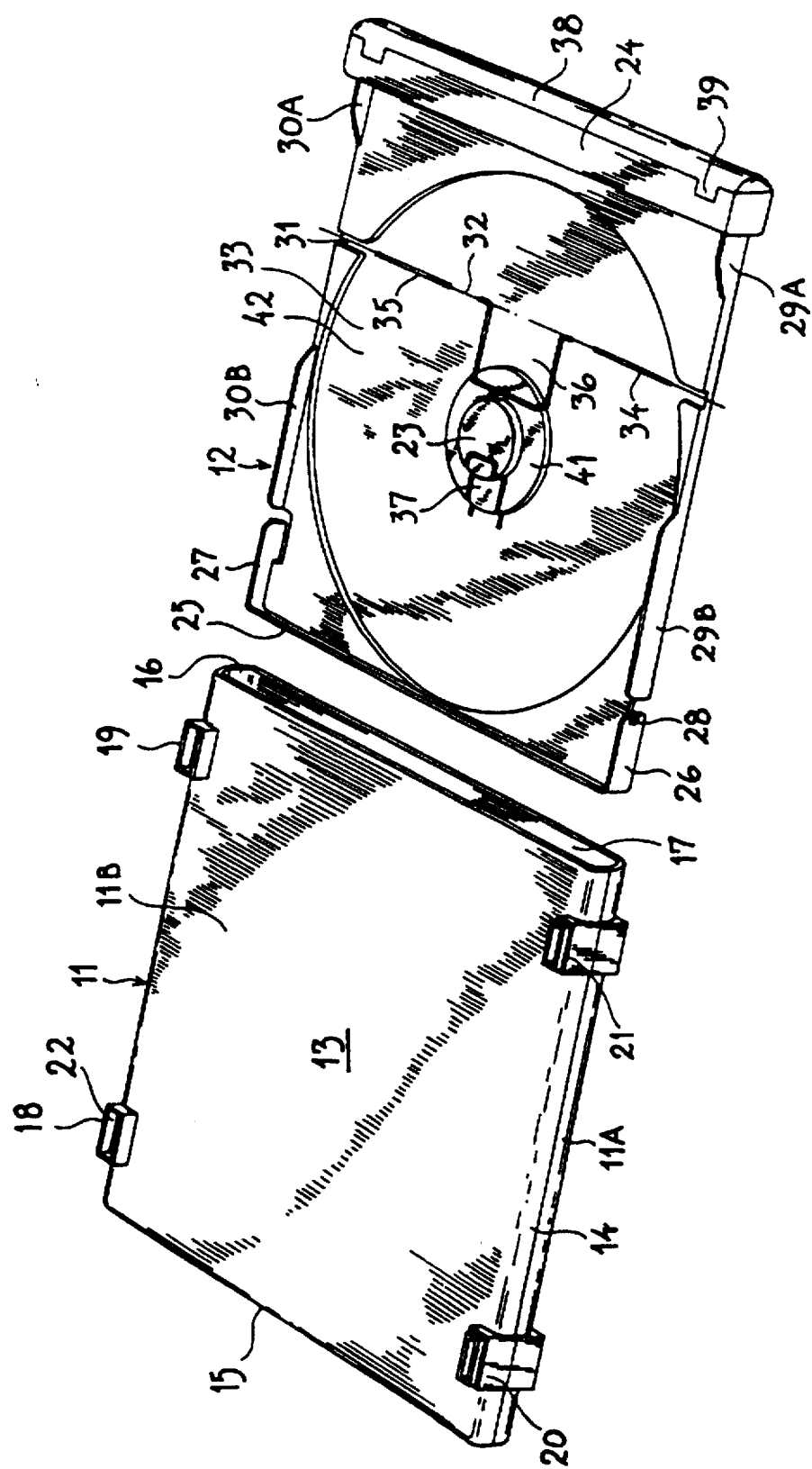
FIG. 1 shows a perspective view of a container according to the invention, with the disc sheath and the disc carrier or disc drawer shown in exploded view.
Figure 3:
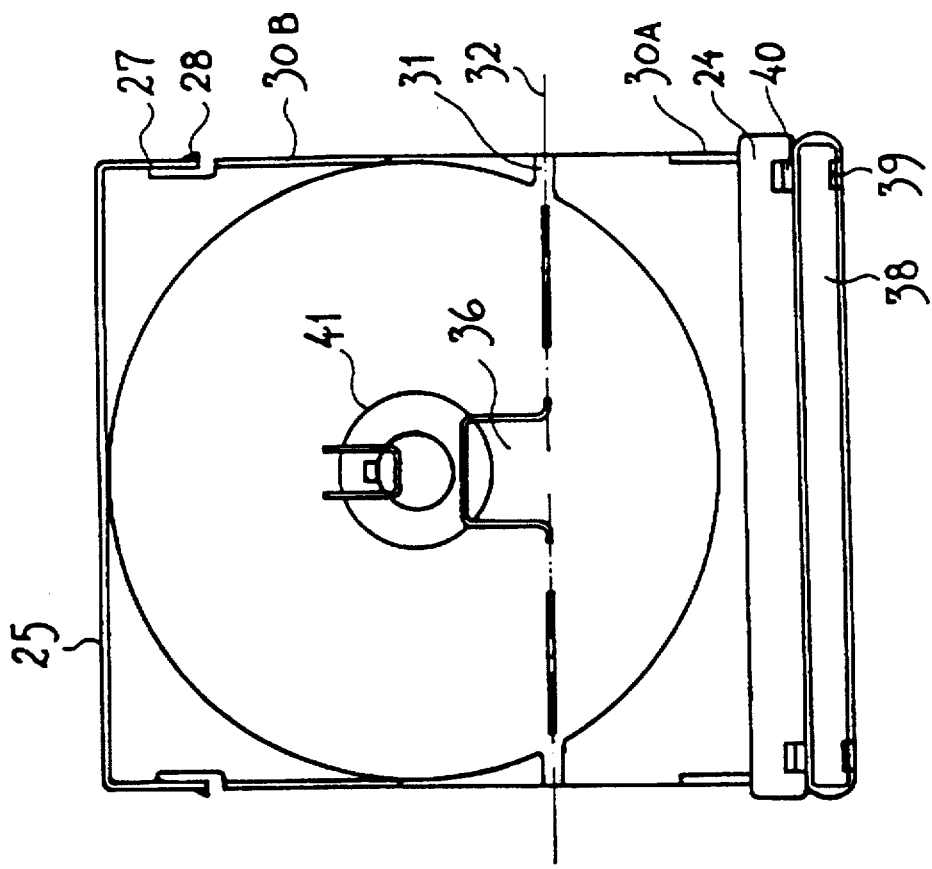
FIG. 3 shows a top plan view of the disc drawer.

In FIG. 1 a disc sheath or cover 11, is shown, adapted to accomodate a disc drawer or inner part 12 acting as a disc carrier. The cover 11 in the example has two identical halves 11A, B, each being rectangular in shape with low walls 14, 15, 16 along three sides and an outer rounding of the edges. The walls may have mating grooves and ridges for interacting and the two halves may be glued or welded together, e.g. by ultrasonic welding.

On each side adjoining the opening 17, each of the 11A, B is provided with two lugs, a female set 18, 19 and a male et 20, 21 which may engage a dimple 22 in the opposite female lug. The lugs 18–21 provide means for engaging two disc covers 11 adjoining each other in a certain position. The pair of lugs may be designed to keep two covers stet.

The lugs 18–21 will also function as spacers, providing a suitable distance between two stacked containers to enable the gripping of the disc drawer 12.

In an alternative embodiment suitable for preparing container racks, pairs of covers can be manufactured integrated, back to back. In this case the halves are disconnectably coupled by providing mating holes and studs extending from the walls 14–16.

The disc cover can also be prepared in one piece, as a boxshaped pocket, with an outer and inner design close to that of the above example.

Inside the opening 17 a stop lug (not shown) is provided to engage a corresponding lug on the disc drawer (se below).

The disc carrier or disc drawer 12 is generally designed as a box with a bottom 42, a centrally located center grip 23 and a hand-grip portion 24 at the front edge. The back wall 25 of the disc drawer is extending over the total width, with short wings 26 and 27 at each end. The wings 26 and 27, ending in free parts, have a stop lug 28 on the outer side at the end. The stop lugs 28 are adopted to engage a corresponding lug in the disc cover, when the disc drawer is opened, to prevent complete detachment.

The side walls 29 and 30 of the disc drawer are divided into a front part 29A and 30A, and a back part 29B and 30B, with an interposed gap 31. The gap 31 is arranged on a chord 32 through the front half of a circular recess 33 in the bottom 42. Along this chord, on both sides of the center, slots 34 and 35 are provided through the bottom 42. The purpose is to provide a hinge line for hinging the disc drawer 12, as described below.

Figure 2:
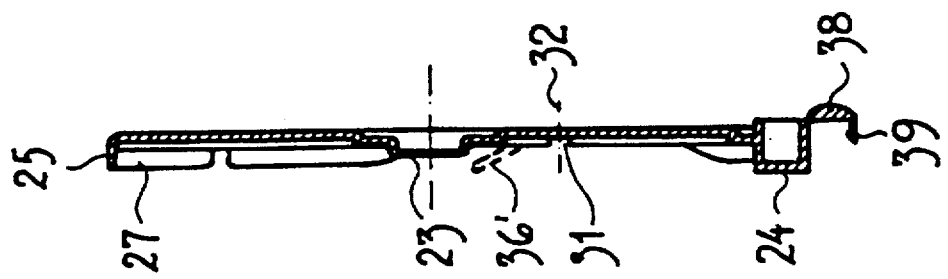

The bottom 42 is provided with a tongue 36 adjoining the hinge line, facing the center grip 23, and ending at a distance from the center grip. Bending downward of the front part of the disc drawer will tilt the tongue, in a raised position relative to the surrounding parts of the bottom 42, as illustrated by 36' in FIG. 2. This will disengage a disc (not shown) in the disc drawer from the center grip 23 and bring it to a raised position for easy gripping. The tongue 36 can be dimensioned to be of elastic construction such that it returns to a straight position.

To make access to the disc easier, the side walls 29 and 30 have a reduced height adjacent to the line of hinge 32.

The center grip 23 is on the back side relative to the front of the disc drawer provided with a tongue 37 protruding from the bottom 22 to provide a part of the center grip 23. The tongue 37 may be resilient to outer radial pressure and thus provide a resilient latch to keep the disc in place. The tongue may have a radial lug for additional security.

The hand-grip portion 24 is provided as a protruding rib. At the front side, a transparent cover rail 38 with a bevelled lens makes the outer side with two lugs 39 at the free edge, which can engage corresponding recesses 40 at the top of the hand-grip portion. The cover rail 38 may engage a strip label (not shown) and also make print or written information more easily visible. It will protect the label during the handling of the front part.

Concentrically to the center grip 23 is an annular step 41 protruding from the bottom base.

The disc cover and the disc drawer or carrier are suitably manufactured from plastic.

We claim:

1. A container for compact discs having a pocket shaped disc cover (11) and a disc drawer (12) for insertion in the cover with a disc having a central opening thereon, said disc drawer being provided with a circular recess (33) to receive the disc and a center member (23) to maintain the disc in position by engaging the central opening, a front part of the disc drawer (12) being provided with a hinge line (32) crossing the front portion of the recess (33) to expose the adjacent part of the disc characterized by a tongue (36) extending from the hinge (32) and rigidly connected to the front part of the disc drawer.

2. Container according to claim 1, characterized in that the disc drawer (12) has side walls (29, 30) with reduced height at the hinge line (32).

3. Container according to claim 1, characterized in that the center member (23) of the disc drawer (12) at the side remote from the hinge line (32) is provided with a resilient tongue (37) to keep the disc resiliently in position.

4. Container according to claim 2, characterized in that the center member (23) of the disc drawer (12) at the side remote from the hinge line (32) is provided with a resilient tongue (37) to keep the disc resiliently in position.

* * * * *